No. 746,830. PATENTED DEC. 15, 1903.
T. HAMILTON-ADAMS.
ELECTRIC ARC LAMP.
APPLICATION FILED JUNE 4, 1903.
NO MODEL.
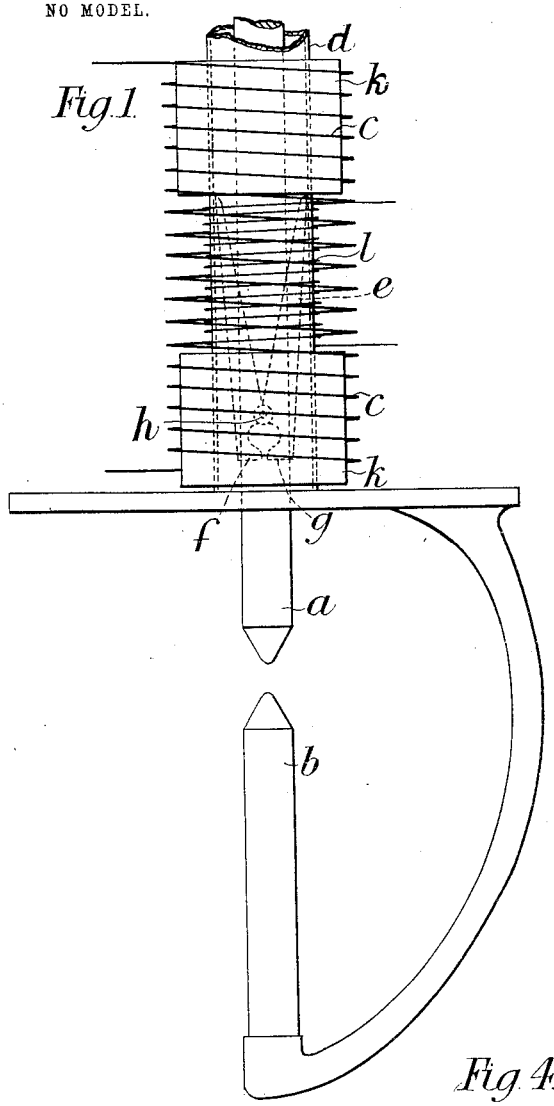
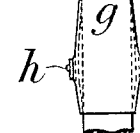
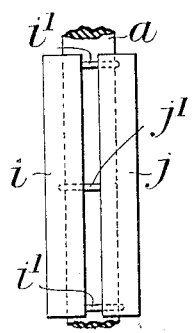
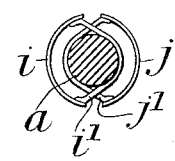
Witnesses.
Inventor.

No. 746,830.                                                        Patented December 15, 1903.

UNITED STATES PATENT OFFICE.

THOMAS HAMILTON-ADAMS, OF LONDON, ENGLAND.

ELECTRIC-ARC LAMP.

SPECIFICATION forming part of Letters Patent No. 746,830, dated December 15, 1903.

Application filed June 4, 1903. Serial No. 160,092. (No model.)

*To all whom it may concern:*

Be it known that I, THOMAS HAMILTON-ADAMS, a subject of the King of Great Britain, residing at Howard House, Arundel street, Strand, London, England, have invented new and useful Improvements in Electric-Arc Lamps, of which the following is a specification.

This invention relates to improvements in electric-arc lamps of the kind wherein the movable carbon is moved toward the fixed carbon by gravity and is raised by a solenoid-core which automatically grips the movable-carbon holder or carbon. In connection with lamps of this description it has already been proposed to make use of a solenoid-core consisting of two clutch-pieces pivoted together, and which are magnetized under the influence of the solenoid, so that the two pivoted parts are caused to repel one another at one end, and thus to grip the carbon or carbon-holder at the other end. Furthermore, it has also been proposed to make use of a kind of toggle-clutch device in connection with a pair of magnets, the said toggle device being arranged inside the carbon-holder in such a manner that when attracted by the magnets the toggle-clutch expands and grips the carbon-holder, so as to raise the latter with it as it moves under the attraction of the magnets. Now with all arrangements of this kind it is found in practice that the clutches do not possess sufficient power to properly control the carbons, and it is the object of this invention to overcome this defect.

According to my invention I make use of a clutch device for gripping the carbon or carbon-holder comprising, preferably, two parts, between which the carbon or carbon-holder is held, and one or both of which parts forms or form the core of a solenoid designed to raise the clutch, and thereby the movable carbon, when current is passed through it. To give the necessary lateral movement to the clutch parts, I provide the solenoid with one or more magnet-poles (which may be independent of the solenoid) so arranged as to provide the necessary conjoint lateral and axial attraction to cause the clutch to operate to grip and raise the carbon.

In the accompanying drawings, Figure 1 is an elevation of the chief parts of an arc-lamp having the improvements applied to it. Figs. 2 and 3 are two elevations, respectively at right angles to one another, of one form of carbon-clutch. Figs. 4 and 5 are a side elevation and a plan, respectively, of a modified form of clutch; and Fig. 6 is a diagrammatic view illustrating the mode of action of the clutch device.

$a$ is the upper or movable carbon, and $b$ the lower carbon of the lamp, $c$ being the solenoid which is designed to control the arc between the two carbons.

$d$ is a brass or like tube which is inserted in the solenoid $c$, and $e$ is the core of the said solenoid, this core also serving as the clutch for raising the upper or movable carbon $a$.

In the drawings I have illustrated two suitable forms of clutch—namely, that illustrated in Figs. 2 and 3 and that illustrated in Figs. 4 and 5. In the former arrangement the clutch comprises the two plates $f$ and $g$, which are pivoted together at $h$ at their lower ends and which are curved, so as to conform to the cylindrical shape of the carbon. When the upper ends of the two plates $f$ and $g$ are pulled apart into the position shown, their lower ends grip the carbon. In the arrangement illustrated in Figs. 4 and 5 the clutch comprises the two curved plates $i$ and $j$, the former of which is provided with two rings or loops $i'$ $i'$, one at the top and one at the bottom thereof, and the latter with a ring or loop $j'$ at about its middle point. The carbon is passed through these three rings in the manner illustrated in Fig. 4, so that by moving the two plates apart from one another they grip the carbon, the ring being of such a size that when the plates are approached toward one another the carbon is free to move. It will be clear that only one of the plates need be of magnetic material.

To provide the necessary lateral pull upon the clutch parts to effect the gripping of the carbon, as above described, I provide the solenoid with auxiliary poles, these being advantageously obtained by inserting at each end of the solenoid an iron ring $k$, whereby when current is caused to flow throuhg the solenoid $e$ the necessary poles are provided.

The operation of the device will be clearly understood by reference to the diagrammatic view shown in Fig. 6. When current is caused to flow through the solenoid $e$, it produces, for instance, the sets of poles marked $+$ and $-$ in this figure—that is to say, the upper ring $k$ will have a north pole at the top and a south pole at the bottom, the clutch-core $e$ and the bottom ring $k$ being also similarly magnetized. It will thus be clear that the tendency is to draw the clutch-core upward into the said solenoid in the usual manner and also to pull apart the two portions of the clutch, and thereby lock the carbon, this result being due to the fact that the adjacent ends of the internal rings $k\ k$ and of the clutch-core are of such polarity relatively with one another as to produce this effect.

In the case of differential lamps for series working an additional shunt-coil $l$ is provided inside the solenoid-coil $e$, the said coil $l$ being antagonistic to the coil $e$.

Having now particularly described and ascertained the nature of my said invention and in what manner the same is to be performed, I declare that what I claim is—

1. In electric-arc lamps, the combination with the movable carbon, of a solenoid, of auxiliary poles in the solenoid and of a solenoid-core composed of a plurality of parts which engage the carbon so as to grip the same when the solenoid is energized, substantially as hereinbefore described.

2. In electric-arc lamps, the combination with the movable carbon, of a solenoid, of auxiliary poles in the solenoid and of a solenoid-core consisting of a plurality of plates inclosing the carbon and pivoted together near their lower ends so as to grip the carbon when the solenoid is energized, substantially as hereinbefore described.

3. In electric-arc lamps, the combination with the movable carbon, of a solenoid, of auxiliary poles in the solenoid and of a solenoid-core consisting of a plurality of plates having rings through which the carbon passes and which grip the said carbon when the solenoid is energized, substantially as hereinbefore described.

THOMAS HAMILTON-ADAMS.

Witnesses:
C. G. REDFERN,
A. ALBUTT.